United States Patent
Lee et al.

(10) Patent No.: US 12,395,346 B2
(45) Date of Patent: Aug. 19, 2025

(54) MESSAGE CHAIN-BASED CONTROLLER AREA NETWORK (CAN) SECURITY SYSTEM AND METHOD WITH HASH FUNCTION

(71) Applicant: PUKYONG NATIONAL UNIVERSITY INDUSTRY-UNIVERSITY COOPERATION FOUNDATION, Busan (KR)

(72) Inventors: Kyungchang Lee, Busan (KR); Hyunjun Jang, Busan (KR); Hyeongjun Kim, Busan (KR); Hyunhee Kim, Busan (KR); Eunhye Sin, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 445 days.

(21) Appl. No.: 18/083,171

(22) Filed: Dec. 16, 2022

(65) Prior Publication Data

US 2023/0239158 A1    Jul. 27, 2023

(30) Foreign Application Priority Data

Dec. 30, 2021 (KR) .......................... 10-2021-0193332

(51) Int. Cl.
*H04L 9/32* (2006.01)
*H04L 9/08* (2006.01)
(Continued)

(52) U.S. Cl.
CPC .......... *H04L 9/3242* (2013.01); *H04L 9/0869* (2013.01); *H04L 12/40026* (2013.01);
(Continued)

(58) Field of Classification Search
None
See application file for complete search history.

(56) References Cited

U.S. PATENT DOCUMENTS

| 7,631,186 B2 * | 12/2009 | Okabe | H04W 12/062 |
| | | | 713/168 |
| 11,240,219 B2 * | 2/2022 | Smirnoff | H04L 9/0861 |

(Continued)

FOREIGN PATENT DOCUMENTS

| CN | 106471767 B | * | 12/2019 | ........... | B60R 16/023 |
| CN | 110446183 B | * | 4/2022 | ........... | H04L 9/3268 |

(Continued)

*Primary Examiner* — Ali H. Cheema
(74) *Attorney, Agent, or Firm* — Paratus Law Group, PLLC

(57) ABSTRACT

The present disclosure relates to a message chain-based Controller Area Network (CAN) security system and method with a hash function, which enables efficient detection of a malicious message through a message-based security scheme utilizing a hash function in the system. In an implementation, the method comprising steps of generating a hash value based on a Hash Reset Key and message ID received by the system, transmitting a CAN message including the hash value, allowing message reception and executing a command when it is determined that the hash value included in the CAN message is valid, and transmitting an intruder detection warning when it is determined that the hash value included in the CAN message is not valid.

8 Claims, 7 Drawing Sheets

(51) Int. Cl.
*H04L 12/40* (2006.01)
*H04L 9/00* (2022.01)
*H04L 9/06* (2006.01)
*H04L 9/40* (2022.01)

(52) U.S. Cl.
CPC .......... *H04L 9/0643* (2013.01); *H04L 9/3236* (2013.01); *H04L 9/50* (2022.05); *H04L 12/40* (2013.01); *H04L 2012/40215* (2013.01); *H04L 2012/40273* (2013.01); *H04L 63/123* (2013.01)

(56) References Cited

U.S. PATENT DOCUMENTS

| | | | |
|---|---|---|---|
| 2002/0095601 A1* | 7/2002 | Hind | H04L 9/3231 713/176 |
| 2002/0164026 A1* | 11/2002 | Huima | H04W 12/06 380/247 |
| 2003/0212893 A1* | 11/2003 | Hind | H04L 9/3247 713/177 |
| 2013/0269007 A1* | 10/2013 | Yoshigaki | H04L 63/083 726/5 |
| 2015/0229634 A1* | 8/2015 | Takeo | H04L 63/083 726/6 |
| 2019/0357040 A1* | 11/2019 | Benoliel | H04W 12/71 |
| 2021/0397715 A1* | 12/2021 | Duval | G06F 21/57 |
| 2023/0308877 A1* | 9/2023 | Morchon | H04L 9/3247 |

FOREIGN PATENT DOCUMENTS

| | | | |
|---|---|---|---|
| DE | 102012209408 A1 * | 12/2013 | ........... H04L 9/0847 |
| JP | H08340330 A * | 12/1996 | |
| KR | 10-2011-0057348 A | 6/2011 | |
| KR | 10-2020-0075604 A | 6/2020 | |
| KR | 10-2194469 B1 | 12/2020 | |
| KR | 20210071847 A * | 6/2021 | |

* cited by examiner

MESSAGE CHAIN-BASED CONTROLLER AREA NETWORK (CAN) SECURITY SYSTEM AND METHOD WITH HASH FUNCTION

ACKNOWLEDGEMENT

This work was supported by the Technology development Program (S3282183) funed by the Ministry of SMEs and Startups (MSS, Republic of Korea).

CROSS-REFERENCE TO PRIOR APPLICATION

This application claims priority to Korean Patent Application No. 10-2021-0193332 (filed on Dec. 30, 2021), which is hereby incorporated by reference in its entirety.

BACKGROUND

The present disclosure relates to Controller Area Network (CAN) security and, more specifically, to a message chain-based CAN security system and method with a hash function, which enables efficient detection of a malicious message through a message-based security scheme utilizing a hash function in the CAN system, a vehicle network system that does not provide a separate security protocol.

Since the advent of the Electronic Control Unit (ECU), fuel supply has begun to be replaced by direct injection methods through electronic control (e.g., GDI, MPI, EUI, and CRDi). Nowadays, a vehicle is equipped with many electronic control systems, including an engine control unit, a vehicle attitude control unit, and an ABS unit. Accordingly, the number of ECUs in the vehicle is continuously increasing.

As mentioned above, the ECUs mounted on the vehicle communicate with each other using methods such as CAN, LIN, and FlexRay. Among them, CAN performs communication based on differential voltages utilizing a pair of twisted wires, thereby exhibiting physical characteristics very robust against electrical disturbances. In this respect, CAN is used most stably for vehicle communication and transmitting and receiving important data.

Recently, the ECU of a vehicle is used not only for simple vehicle control but also for providing services for passengers to use convenience functions, interact with the vehicle, and utilize their vehicle driving time more efficiently.

In particular, the development and installation of high-performance ECUs are constantly being researched to provide semi-autonomous driving and online services. To this end, a wireless network connection through a telecommunications company is essential, and some of the vehicle's ECUs are connected online to provide various services.

As described above, current vehicles perform a wide range of communication tasks from simple control inside the vehicle to mutual communication with the outside, drawing attention as a target for cyber attacks. When a cyber-attack intrudes on communication, normal operation of a vehicle may become impossible, or malfunction of the vehicle may lead to damage.

In particular, since CAN does not mandate separate security specifications, if an attacker infiltrates the CAN BUS anyhow, all systems may become incapacitated, leading to a dangerous situation in which numerous vehicles are immobilized or control rights are taken away.

Providing various services using a wireless communication system may be crucial for a user to decide to purchase a vehicle. General users may enjoy the maximum convenience options, such as a semi-autonomous driving system through a navigation-based smart cruise function, while corporate users may maximize the efficiency of the production system through an automated logistics system and vehicle platooning.

In many fields, the wireless communication service for vehicles is steadily counted as one of the most necessary technologies in modern society beyond the 4th industry to the 5th industry.

However, since wireless communication is easily selected as a target by hackers, the security of wireless network communication is thoroughly strengthened. In particular, many telecommunications companies continue improving wireless communication security to provide online control and monitoring services through 5G and 6G communication; however, once security is incapacitated, the extent of damage goes beyond imagination. In other words, there is no perfect system.

Therefore, it is necessary to strengthen the security of the internal wired network to prepare for a situation that allows an attacker to intrude at the wireless gateway level.

It is possible to add security options to Ethernet, FlexRay, and the like, which exhibit relatively wide bandwidth or fast communication speed. However, CAN currently does not have any security specifications, and it is somewhat difficult to install security specifications due to the nature of the protocol.

Therefore, it is necessary to set security at the hardware level; however, since security settings at the hardware level may cause enormous costs, it is time to develop security options at the software level.

It is difficult to implement security specifications on the CAN protocol; nonetheless, research is conducted yearly to overcome the CAN protocol's shortcomings and implement security solutions.

Security techniques applied before communication is performed include cryptographic methods using certificates and symmetric key types, and intrusion detection techniques detect intrusion of an attacker by monitoring communication after the communication is performed.

However, the former case may not guarantee the real-time performance of CAN or fail to overcome capacity limitations in many cases. For the latter case, there is a chance of failing to detect an attack when the attacker takes a detour.

Therefore, there is a need to develop a new enhanced security technology suitable for a vehicle network environment in which control messages are transmitted and received periodically and capable of minimizing delay and being applied to all messages.

PRIOR ART REFERENCES

Patents (Patent 1) Korea laid-open patent No. 10-2020-0075604
(Patent 2) Korea laid-open patent No. 10-2011-0057348
(Patent 3) Korea registered patent No. 10-2194469

SUMMARY

The present disclosure has been made to solve the problem of the Controller Area Network (CAN) security technology of the prior art and intends to provide a message chain-based CAN security system and method with a hash function, which enables efficient detection of a malicious message through a message-based security scheme utilizing a hash function in the CAN system, a vehicle network system that does not provide a separate security protocol.

An object of the present disclosure is to provide a message chain-based CAN security system and method with a hash function which provides enhanced security features suitable for a vehicle network environment in which control messages are transmitted and received periodically and capable of minimizing delay and being applied to all messages.

An object of the present disclosure is to provide a message chain-based CAN security system and method with a hash function, which may be applied to various networks without increasing the number of computations by using a message chain-based security method that connects messages of the same ID into a chain by assigning a value generated through a hash function into the message transmitted periodically.

An object of the present disclosure is to provide a message chain-based CAN security system and method with a hash function so that the hardware structure may be implemented without a high cost by adding only one HASH ECU to the CAN BUS configuration.

An object of the present disclosure is to provide a message chain-based CAN security system and method with a hash function, which improves security in a vehicle network environment in which control messages are transmitted and received periodically by examining whether a received message stores hash bits at the correct hash bit positions, executing a message command if the hash bits match the hash bit positions, and transmitting an intruder warning message to the network if the matching fails.

An object of the present disclosure is to provide a message chain-based CAN security system and method with a hash function, which achieves robust security characteristics by using a hash value only when a message is transmitted or received and removing the hash value immediately after the hash value is used instead of verifying the hash value from the accumulation of records.

Other technical objects of the present disclosure are not limited to those described above. Other technical objects not mentioned above may be understood clearly by those skilled in the art from the descriptions given below.

To achieve the objects above, a message chain-based CAN security system with a hash function according to the present disclosure comprises a hash value generating unit generating a hash value $H_{(r,ID,i)}/H'_{(r,ID,i)}$ using a received Hash Reset Key $HRK_r$ and ID to be transmitted or received by the system when an arbitrary node transmits the $HRK_r$; a CAN message transmitting unit transmitting a CAN message including the hash value $H_{(r,ID,i)}/H'_{(r,ID,i)}$; a validity determining unit determining whether $H_{(r,ID,i)}$ of a CAN message received by a node which has received the CAN message matches a value held by the system; a message receiving and executing unit allowing message reception and executing a command when the validity determining unit determines that the CAN message is valid; and a warning transmitting unit transmitting an intruder detection warning when it is determined that the received CAN message is not valid since $H_{(r,ID,i)}$ of a CAN message received by the validity determining unit does not match the value held by the system.

Here, the system further includes a generation time determining unit determining whether a set time has elapsed from a hash value generation time in the hash value generating unit.

The system further includes a hash reset key generating unit generating a Hash Reset Key $HRK_r$ through a random number generation model if the generation time determining unit determines that the set time has elapsed and a hash value regenerating unit generating a hash value using $H_{(r,ID,i)}$ and transmitting the generated hash value to the CAN message transmitting unit if the set time has not elapsed yet.

A node selected as a master periodically transmits an initialization message, a lower-level slave node generates a hash value for each message ID according to the value stored in the initialization message, a CAN node transmits 4 bits extracted from the generated hash value by including the extracted bits in a vehicle control message, and a receiving node detects a malicious message by determining whether the corresponding 4-bit value matches an existing hash value when receiving the message.

A hash ECU generating a Hash Reset Key $HRK_r$ transmits an HRK to a lower-level communication node, the lower-level communication node generates a hash value using a received HRK and an ID to be transmitted or received by the lower-level communication node, and since a hash function returns the same output value when the same input value is provided, each node generates and maintains the same hash value corresponding to the ID based on which the node performs communication.

An ECU receiving an HRK generates two hash values $H_{(r,ID,i)}$ and $H'_{(r,ID,i)}$ where $H_{(r,ID,i)}$ is a return value of a hash function using HRK and ID as input values, $H_{(r,ID,i)}$ is a return value of a hash function using HRK, ID, and Salt as input values, where the Salt value is a parameter that may be set arbitrarily by a user and is a fixed value for increasing the complexity of the hash function.

To achieve other objects, a message chain-based CAN security method with a hash function according to the present disclosure comprises generating a hash value $H_{(r,ID,i)}/H'_{(r,ID,i)}$ using a received Hash Reset Key $HRK_r$ and ID to be transmitted or received by the system when an arbitrary node transmits the $HRK_r$; transmitting a CAN message including the hash value $H_{(r,ID,i)}/H'_{(r,ID,i)}$ by receiving the hash value $H_{(r,ID,i)}/H'_{(r,ID,i)}$ by the CAN message transmitting unit; determining whether $H_{(r,ID,i)}$ of a CAN message received by a node which has received the CAN message matches a value held by the system; and allowing message reception and executing a command when the received CAN message is valid and transmitting an intruder detection warning when it is determined that the received CAN message is not valid since $H_{(r,ID,i)}$ of a received CAN message does not match the value held by the system.

Here, the method determines whether a set time has elapsed from a hash value generation time in the hash value generating unit, generates a Hash Reset Key $HRK_r$ through a random number generation model if it is determined that the set time has elapsed, and generates a hash value using $H_{(r,ID,i)}$ and transmits the generated hash value to the CAN message transmitting unit if the set time has not elapsed yet.

A node selected as a master periodically transmits an initialization message, a lower-level slave node generates a hash value for each message ID according to the value stored in the initialization message, and a CAN node transmits 4 bits extracted from the generated hash value by including the extracted bits in a vehicle control message, and a receiving node detects a malicious message by determining whether the corresponding 4-bit value matches an existing hash value when receiving the message.

A hash ECU generating a Hash Reset Key $HRK_r$ transmits an HRK to a lower-level communication node, the lower-level communication node generates a hash value using a received HRK and an ID to be transmitted or received by the lower-level communication node, and since a hash function returns the same output value when the same input value is provided, each node generates and maintains the same hash value corresponding to the ID based on which the node performs communication.

An ECU receiving an HRK generates two hash values $H_{(r,ID,i)}$ and $H'_{(r,ID,i)}$ where $H_{(r,ID,i)}$ is a return value of a hash function using HRK and ID as input values, $H'_{(r,ID,i)}$ is a return value of a hash function using HRK, ID, and Salt as input values, where the Salt value is a parameter that may be set arbitrarily by a user and is a fixed value for increasing the complexity of the hash function.

As described above, a message chain-based CAN security system and method with a hash function according to the present disclosure provides the following advantageous effects.

First, the present disclosure enables efficient detection of a malicious message through a message-based security scheme utilizing a hash function in the CAN system, a vehicle network system that does not provide a separate security protocol.

Second, the present disclosure provides enhanced security features suitable for a vehicle network environment in which control messages are transmitted and received periodically and capable of minimizing delay and being applied to all messages.

Third, the present disclosure provides a message chain-based CAN security system and method with a hash function, which may be applied to various networks without increasing the number of computations by using a message chain-based security method that connects messages of the same ID into a chain by assigning a value generated through a hash function into the message transmitted periodically.

Fourth, the present disclosure provides a message chain-based CAN security system and method with a hash function so that the hardware structure may be implemented without a high cost by adding only one HASH ECU to the CAN BUS configuration.

Fifth, the present disclosure improves security in a vehicle network environment in which control messages are transmitted and received periodically by examining whether a received message stores hash bits at the correct hash bit positions, executing a message command if the hash bits match the hash bit positions, and transmitting an intruder warning message to the network if the matching fails.

Sixth, the present disclosure achieves robust security characteristics by using a hash value only when a message is transmitted or received and removing the hash value immediately after the hash value is used instead of verifying the hash value from the accumulation of records.

DETAILED DESCRIPTION

In what follows, preferred embodiments of a message chain-based CAN security system and method with a hash function according to the present disclosure will be described in detail.

Characteristics and advantages of a message chain-based CAN security system and method with a hash function according to the present disclosure will be apparent from the detailed description of each embodiment given below.

Figure 1:
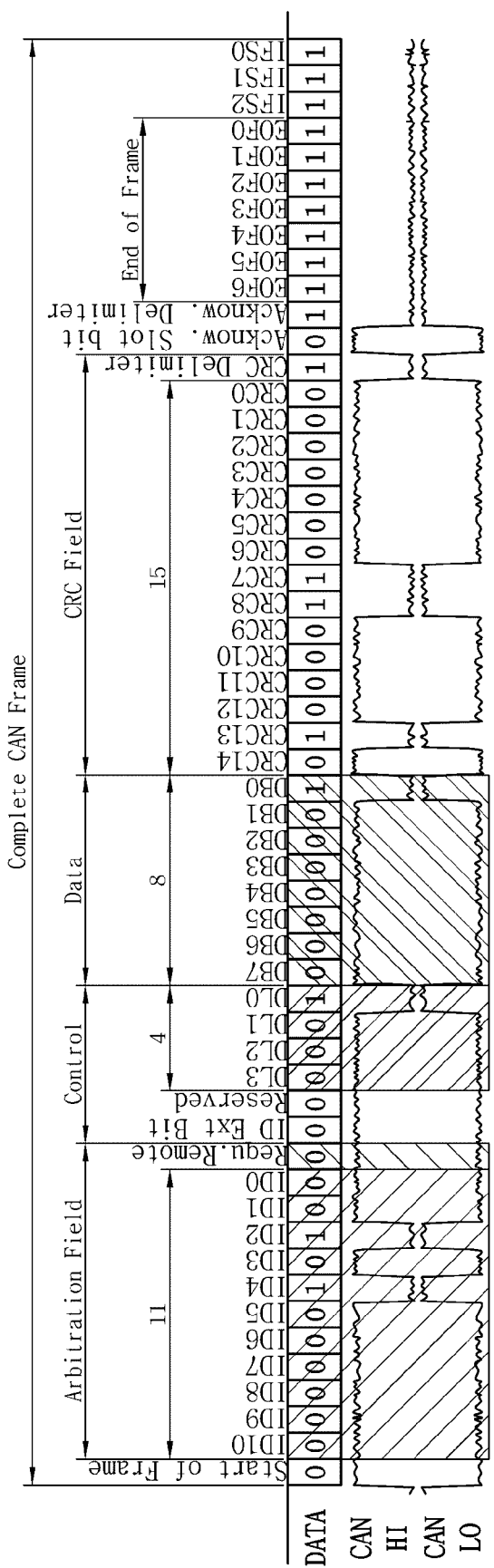
FIG. 1 is a diagram illustrating the CAN frame.
Figure 2:
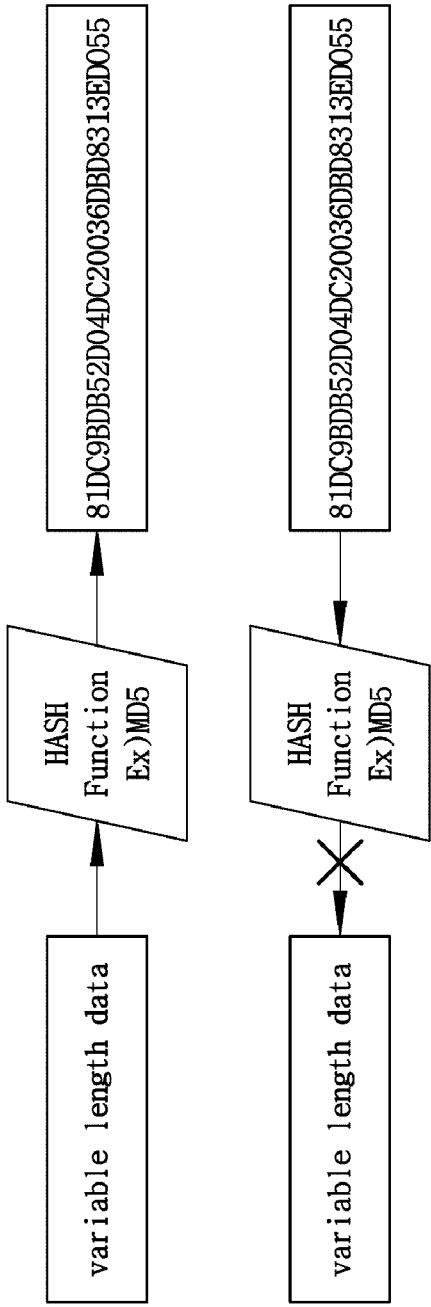
FIG. 2 is a diagram illustrating I/O characteristics of a hash function.

FIG. 1 is a diagram illustrating the CAN frame, and FIG. 2 is a diagram illustrating I/O characteristics of a hash function.

Figure 3:
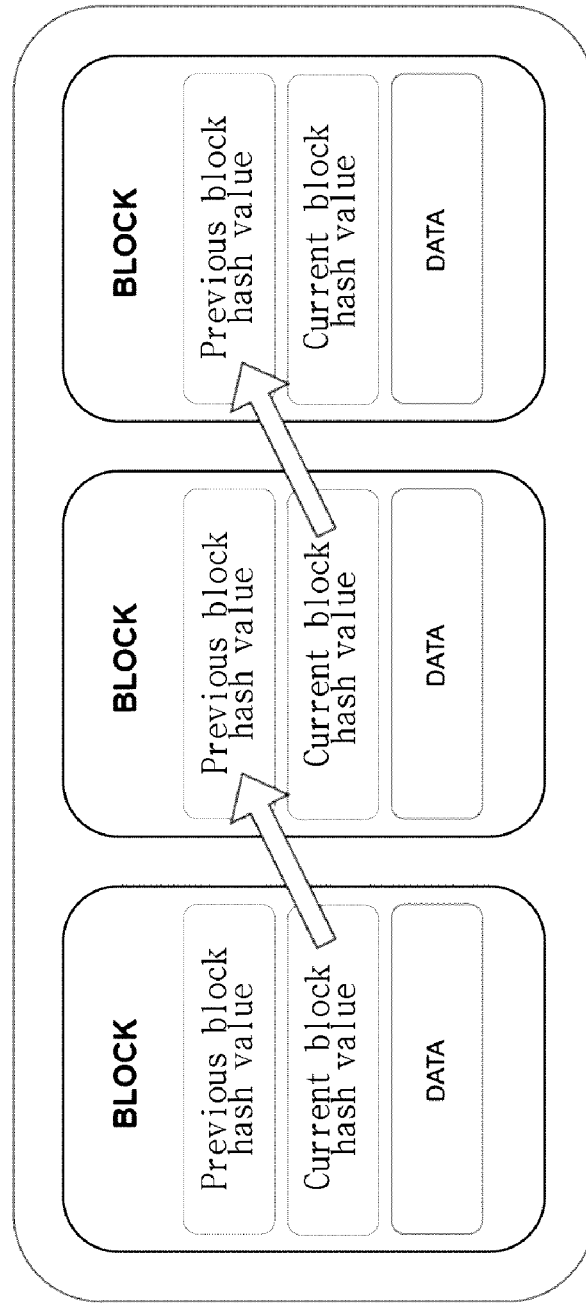
FIG. 3 is a diagram illustrating blockchain characteristics.

FIG. 3 is a diagram illustrating blockchain characteristics.

Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them. Also, the term "unit" or "module" used in the document refers to a base unit for processing at least one function or operation, which may be implemented by hardware or software or a combination of both.

In particular, units that process at least one function or operation may be implemented by at least one processor, and at least one electronic device may be connected to the processor according to a method of processing the function or operation. Electronic devices may include a data input device, a data output device, and a data storage device.

A message chain-based CAN security system and method with a hash function according to the present disclosure enables efficient detection of a malicious message through a message-based security scheme utilizing a hash function in the CAN system, a vehicle network system that does not provide a separate security protocol.

To this end, the present disclosure may include a configuration which may be applied to various networks without increasing the number of computations by using a message chain-based security method that connects messages of the same ID into a chain by assigning a value generated through a hash function into the message transmitted periodically.

The present disclosure may include a configuration which allows implementing a hardware structure without a high cost by adding only one HASH ECU to the CAN BUS configuration.

The present disclosure may include a configuration which improves security in a vehicle network environment in which control messages are transmitted and received periodically by examining whether a received message stores hash bits at the correct hash bit positions, executing a message command if the hash bits match the hash bit positions, and transmitting an intruder warning message to the network if the matching fails.

The present disclosure may include a configuration which achieves robust security characteristics by using a hash value only when a message is transmitted or received and removing the hash value immediately after the hash value is used instead of verifying the hash value from the accumulation of records.

In what follows, a CAN frame structure for implementing a message chain-based CAN security system and method with a hash function according to the present disclosure will be described.

CAN uses CANH and CANL signals for communication through the differential voltage mode.

The voltage difference of greater than 0.9 V is generated between CANH and CANL in the dominant state, where CANL is 0V in the dominant state, as shown in FIG. 1.

In the recessive state, the voltage difference between CANH and CANL is less than 0.5 V, and CANL rises to the intermediate voltage, VCC/2. On the other hand, CANH becomes 5 V in the dominant state; in the recessive state, CANH becomes VCC/2, namely, 2.5 V, which is the same as CANL.

Therefore, generally, based on CANL voltage, 0 V is expressed as LOGIC 0, and 2.5V is expressed as LOGIC 1.

The CAN protocol starts with Start-of-Frame (SoF) and ends with End-of-Frame.

Arbitration Field is located after SoF, which contains a message ID, and the transceiver reads the arbitration field to determine whether the message is supposed to be read by the ECU associated with the transceiver. If the ID is on a receiving list, the corresponding signal is delivered after being converted into an ECU command.

If the ID is not on the receiving list, the ECU stays in a wait mode until the EoF of the message is received.

The Control Field contains information on whether the corresponding message relates to a data frame or a remote frame. A data frame is a message frame that transmits a data value by including the data value in a message, and a remote frame is a message frame that requests another node to transmit a data value.

The CAN protocol determines the priority for each message through the message ID value contained in the arbitration field.

The priority is determined so because the CAN protocol transmits messages through a shared CAN BUS rather than directly from a transmitting ECU to a receiving ECU in a P2P manner. Although dozens of ECU nodes are connected to the shared CAN BUS, the CAN protocol does not use the address of a receiving node at the time of transmitting a message but sends the message by including an ID therein.

All ECUs in the corresponding BUS read and accept the message only if the ID is on the list of messages to be received by the system.

The ECU compliant with the CAN protocol has a built-in transceiver or requires an additional transceiver. The transceiver reads an arbitration value of the data being delivered on the CAN BUS and determines whether the arbitration value is the ID of a message supposed to be read by the ECU associated with the transceiver. If the arbitration value is not the ID of a message to be received by the system, the transceiver ignores the corresponding message; otherwise, the transceiver converts the electrical signal so that the ECU may use the message.

The transceiver also performs the role of message priority competition. The bit value transmitted by the transceiver and the received bit value are compared to determine whether the CAN bus is in the dominant state or recessive state. At this time, if the bit values indicate the same state, transmission continues.

Suppose the states are different. When the system is dominant and the other node is recessive, the system recognizes that it has priority and continues transmission. On the other hand, when the system is recessive and the other node is dominant, the system determines that it has lost its priority and switches to the reception state.

In what follows, a hash function for implementing a message chain-based CAN security system and method with a hash function according to the present disclosure will be described.

The hash function, which is also called a hash algorithm or a hash function algorithm, is a function that maps data of arbitrary size to fixed-size data.

The value returned by a hash function is called a hash value, a hash code, or a hash checksum, or simply a hash. The main characteristics of a hash function are as follows.

First, any inputs considered equivalent yield the same hash value.

Second, it is difficult to infer an input value from an output value.

Third, if two hash values are different, the original data are not equivalent.

Fourth, two different inputs may yield the same hash value.

A hash function returns a very different result from the previous one for the same input with the slightest change in the input value. Therefore, if data is changed, the change may be noticed through the hash value of the corresponding file. Thus, forgery or alteration of a file may be easily detected.

In what follows, a blockchain for implementing a message chain-based CAN security system and method with a hash function according to the present disclosure will be described.

A blockchain is a data management technique that stores the data to be managed in a 'block' operated in the form of an ordered chain.

Blocks are created in a P2P environment, and the blockchain is a distributed computing-based ledger management technology that does not allow anyone to modify the blocks but allows anyone to view changes in data.

Blockchain is fundamentally one form of distributed data storage technology, being implemented as a change list in which constantly changing data is recorded in all participating nodes and designed to prevent arbitrary manipulation by an operator of distributed nodes.

In what follows, a concept of the message chain-based CAN security technology with a hash function according to the present disclosure will be described in detail.

Figure 4:
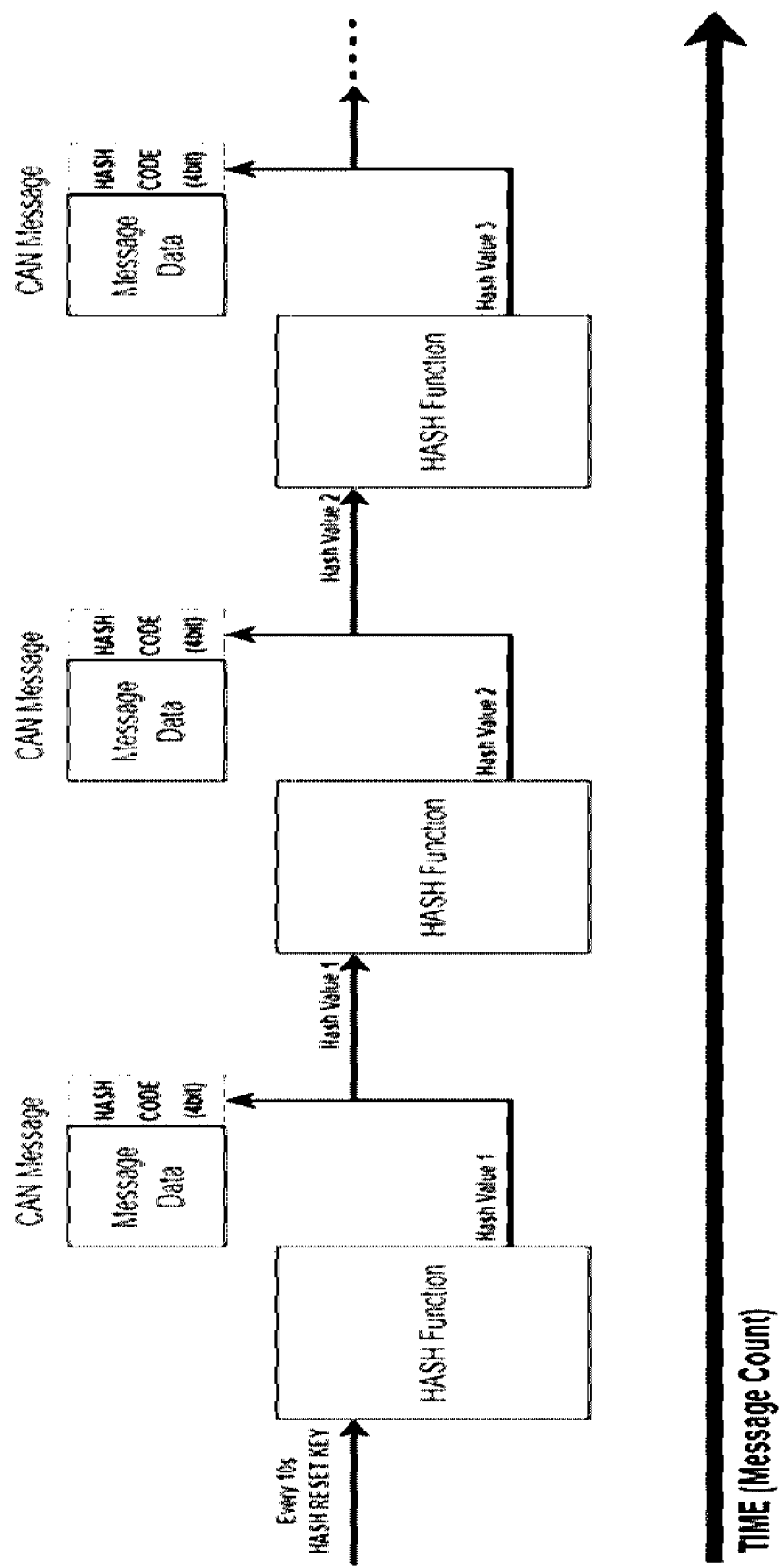
FIG. 4 is a diagram illustrating the concept of a message chain-based CAN security technology to which a hash function according to the present disclosure is applied.

FIG. 4 is a diagram illustrating the concept of a message chain-based CAN security technology to which a hash function according to the present disclosure is applied.

The core of the CAN security algorithm according to the present disclosure lies in the hash chain technique, which uses the idea of the blockchain.

The message to be currently transmitted includes a hash return value obtained by using the value of the previous message as input.

The next message includes a hash return value obtained by using the value of the current message as input. Therefore, all messages have a systematic associative relationship with previous and subsequent messages.

The blockchain technique may be viewed as a spatial encryption method since hash block data is distributed and stored among all users. However, since the CAN security algorithm according to the present disclosure removes an once-used hash value immediately after the hash value is utilized for the next message, records of hash values are not accumulated for verification.

Since the hash value is used only when a message is transmitted or received, it is preferable to interpret the present algorithm as a temporal concept.

Since a message is transmitted according to the passage of time, and an associative relationship between messages is encoded by a parameter called a hash, the algorithm according to the present disclosure may be regarded as being operated according to the passage of time.

In what follows, a message chain-based CAN security system with a hash function according to the present disclosure will be described in detail.

Figure 5:
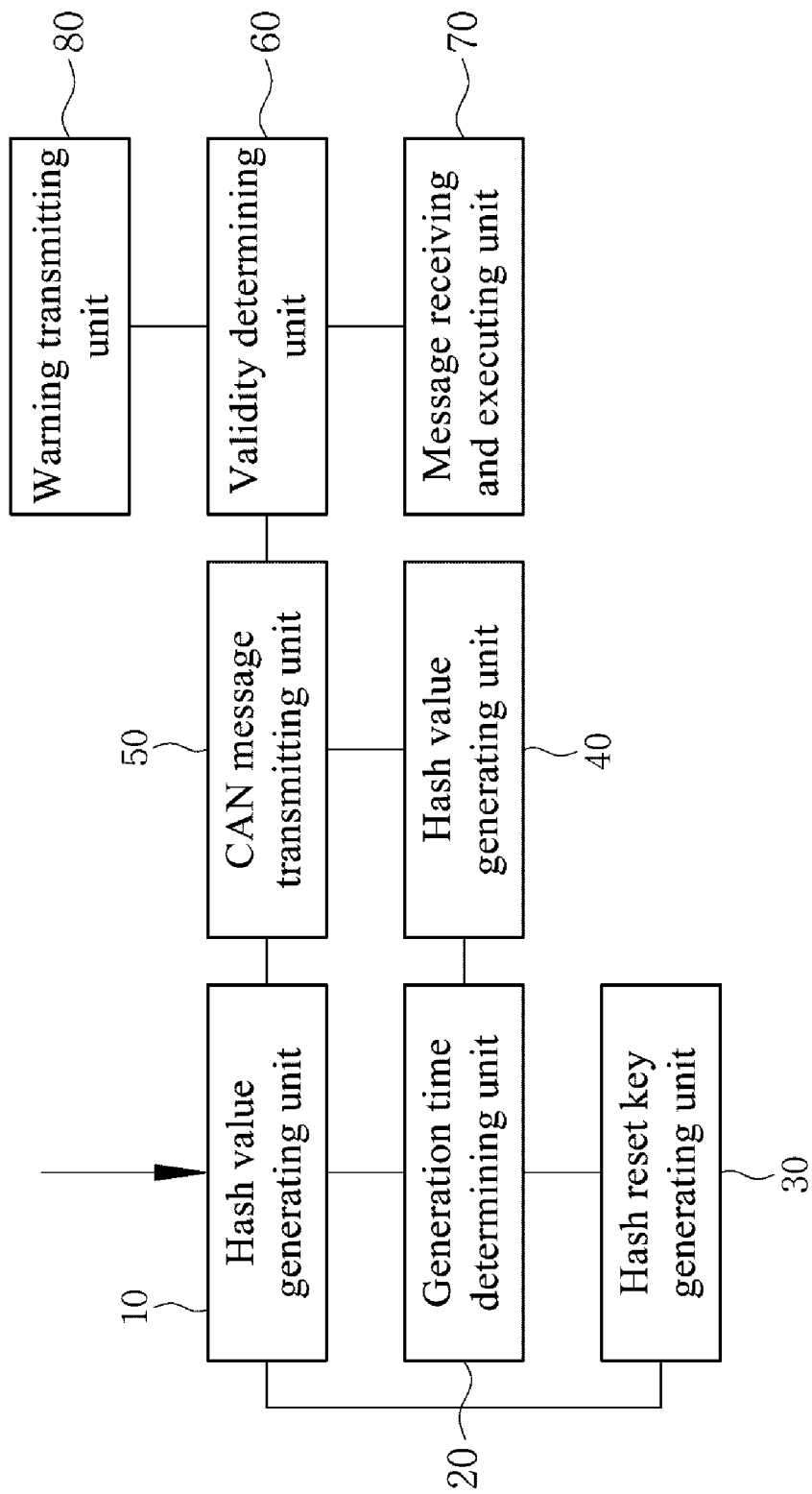
FIG. 5 is a diagram of a message chain-based CAN security system to which a hash function according to the present disclosure is applied.

FIG. 5 is a diagram of a message chain-based CAN security system to which a hash function according to the present disclosure is applied.

A message chain-based CAN security system with a hash function according to the present disclosure comprises a hash value generating unit 10 generating a hash value $H_{(r,ID,i)}/H'_{(r,ID,i)}$ using a received Hash Reset Key $HRK_r$ and ID to be transmitted or received by the system when an arbitrary node transmits the $HRK_r$; a CAN message transmitting unit 50 transmitting a CAN message including the hash value $H_{(r,ID,i)}/H'_{(r,ID,i)}$; a validity determining unit 60 determining whether $H_{(r,ID,i)}$ of a CAN message received by a node which has received the CAN message matches a value held by the system; a message receiving and executing unit 70 allowing message reception and executing a command when the validity determining unit 60 determines that the CAN message is valid; and a warning transmitting unit 80 transmitting an intruder detection warning when it is determined that the received CAN message is not valid since $H_{(r,ID,i)}$ of a CAN message received by the validity determining unit 60 does not match the value held by the system.

Here, the system further includes a generation time determining unit 20 determining whether a set time has elapsed from a hash value generation time in the hash value generating unit 10, a hash reset key generating unit 30 generating a Hash Reset Key $HRK_r$ through a random number generation model if the generation time determining unit 20 determines that the set time has elapsed, and a hash value regenerating unit 40 generating a hash value using $H_{(r,ID,i)}$ and transmitting the generated hash value to the CAN message transmitting unit 50 if the set time has not elapsed yet.

In the message chain-based CAN security system with a hash function according to the present disclosure, a node selected as a master periodically transmits an initialization message, a lower-level slave node generates a hash value for each message ID according to the value stored in the initialization message, a CAN node transmits 4 bits extracted from the generated hash value by including the extracted bits in a vehicle control message, and a receiving node detects a malicious message by determining whether the corresponding 4-bit value matches an existing hash value when receiving the message.

In what follows, a message chain-based CAN security method with a hash function according to the present disclosure will be described in detail.

Figure 6:
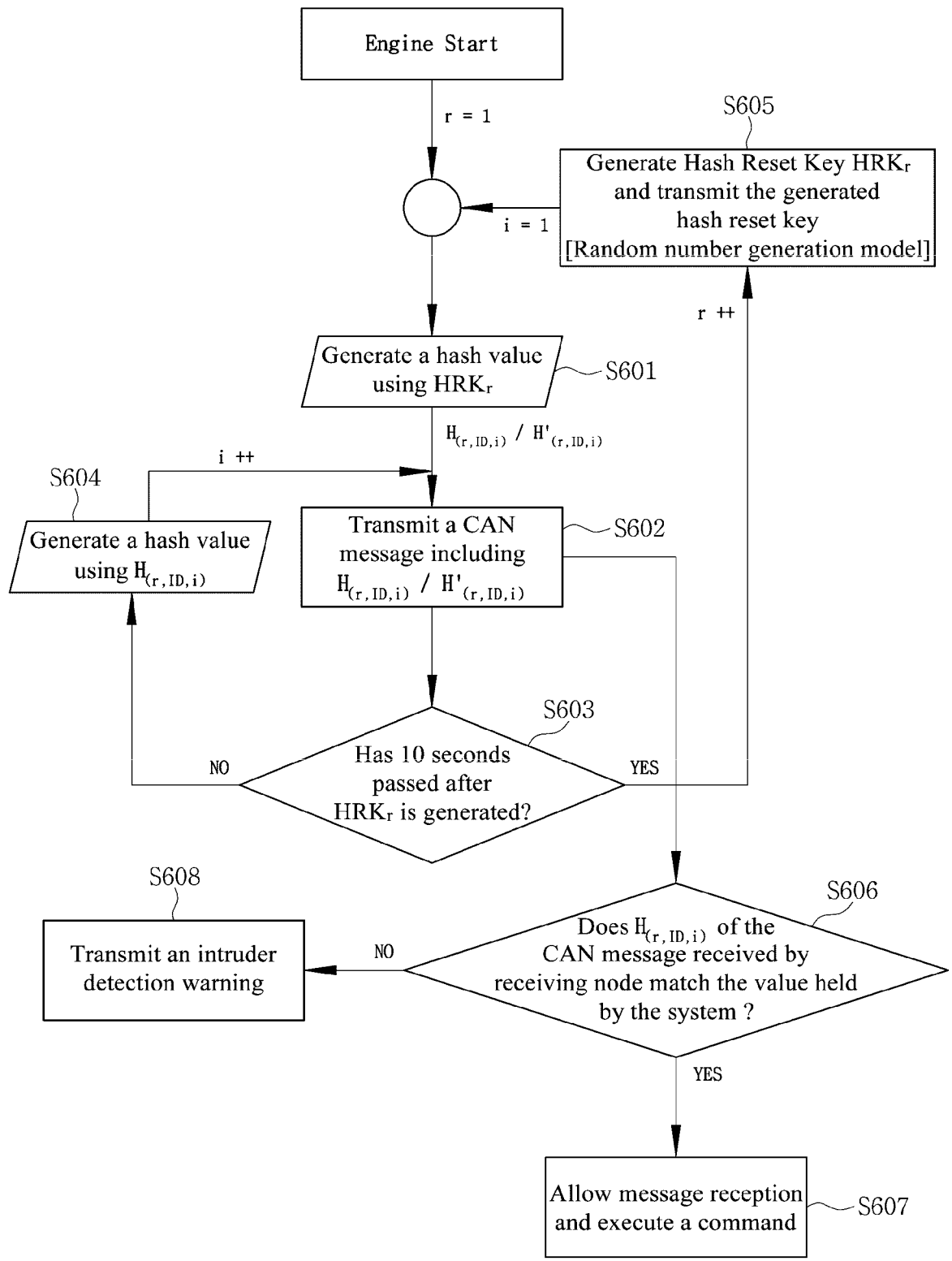
FIG. 6 is a flow chart illustrating a message chain-based CAN security method to which a hash function according to the present disclosure is applied.

FIG. 6 is a flow chart illustrating a message chain-based CAN security method to which a hash function according to the present disclosure is applied.

First, when an arbitrary node transmits a Hash Reset Key $HRK_r$, a hash value $H_{(r,ID,i)}/H'_{(r,ID,i)}$ is generated by using the $HRK_r$ received by the hash value generating unit 10 and an ID to be transmitted or received by the system S601.

Next, the CAN message transmitting unit 50 receives the hash value $H_{(r,ID,i)}/H'_{(r,ID,i)}$ and transmits a CAN message including the hash value $H_{(r,ID,i)}/H'_{(r,ID,i)}$ S602.

Then it is determined whether $H_{(r,ID,i)}$ of the CAN message received by the node matches the value held by the system S606.

When it is determined that the CAN message is valid, message reception is allowed, and a command is executed S607; an intruder detection warning is transmitted when it is determined that the CAN message is not valid since $H_{(r,ID,i)}$ of a received CAN message does not match the value held by the system S608.

Here, it is determined whether a set time has elapsed from a hash value generation time in the hash value generating unit 10 S603; if it is determined that the set time has elapsed, a Hash Reset Key $HRK_r$ is generated through a random number generation model, while, if the set time has not elapsed yet, a hash value is generated using $H_{(r,ID,i)}$, and the generated hash value is sent to the CAN message transmitting unit 50 S604.

In what follows, hash initialization and hash management for each ID will be described.

Figure 7:
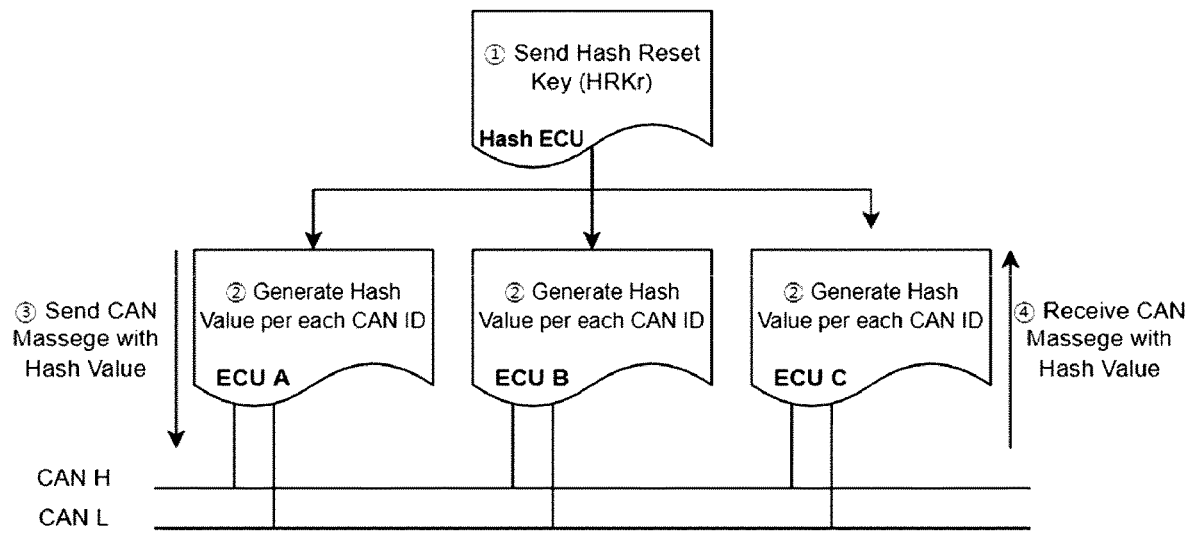
FIG. 7 is a diagram illustrating a process of distributing a hash reset key and updating a hash code.

FIG. 7 is a diagram illustrating a process of distributing a hash reset key and updating a hash code.

The hash ECU transmits a Hash Reset Key (HRK) to a lower-level communication node. The lower-level communication node generates a hash value using the received HRK and an ID to be transmitted or received by the lower-level communication node.

Since a hash function returns the same output value when the same input value is provided, each node may generate and maintain the same hash value corresponding to the ID based on which the node performs communication.

Figure 8:
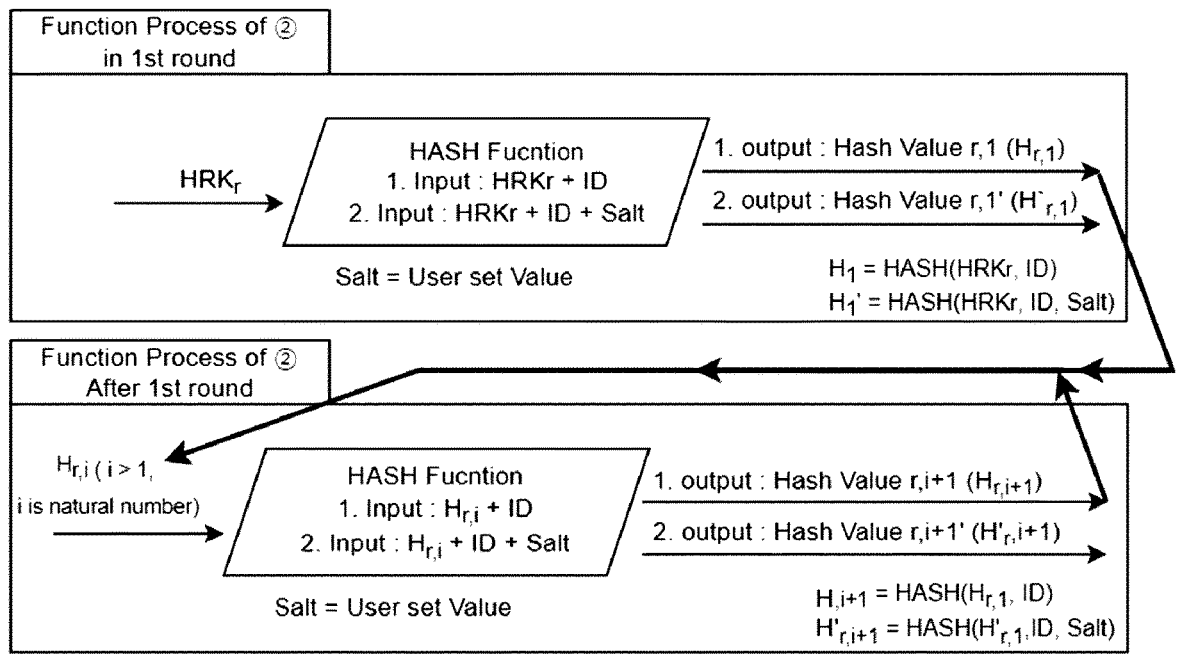
FIG. 8 is a diagram illustrating a process for generating a hash value inside of each ECU.

FIG. 8 is a diagram illustrating a process for generating a hash value inside of each ECU.

An ECU receiving an HRK has to generate two hash values $H_{(r,ID,i)}$ and $H'_{(r,ID,i)}$, which are denoted as $H_{(r,ID,i)}$ and $H'_{(r,ID,i)}$, respectively. $H_{(r,ID,i)}$ is a return value of a hash function using HRK and ID as input values, and $H'_{(r,ID,i)}$ is a return value of a hash function using HRK, ID, and Salt as input values.

At this time, the Salt value is a parameter that may be set arbitrarily by a user and is a fixed value for increasing the complexity of the hash function. Depending on the situations, the Salt value may be set as a variable.

Table 1 illustrates a case where the HRK is 123, ID is 0x478, and the Salt value is '.

TABLE 1 ex) in case of [HRKr=123], [ID = 0x478], [Salt = ']
Hr,1 =81DC9BDB52004DC20036DBD8313ED055
H'r,1= 52AC6ADEACC6CA4FCB3F8726E8BEA0B6

TABLE 1-continued $HP_1$ = Hash_Position$_1$ = 1st value of h1
HashCode$_1$ = $HP_1^{th}$ value of h2
define HashCode$_1$ HC$_1$
define Position_Value, PV$_1$
in this case, HC$_1$ = E = $1110_{(2)}$
PV1 = 1, PV2 = D, PV3 = C, PV4 = 9
$PV_1 = PV_1+1$
// $PV_1$ => 0~F => 1~16
$P1_1 = PV1_1$
$P2_1 = P1_1 + PV2_1$
$P3_1 = P2_1 + PV3_1$
$P4_1 = P3_1 + PV4_1$
so $P1_1$~$P4_1$ = 2, 16, 29, 39
then, insert HC$_1$ in '$Pn_1$'th CAN DATA Field as below
CAN DATA FIELD: X1XXXXXX XXXXXXX0 XXXXXXXX XXXX0XXX
XXXXXX0X XXXXXXXX XXXXXXXX XXXXXXXX A node receiving an arbitrary code 0x478 receives the HRK value 123 and generates $H_{(r,ID,i)}$ and $H'_{(r,ID,i)}$. At this time, by using the first value of $H_{(r,ID,i)}$, 8, the eighth character of $H'_{(r,ID,i)}$, E, is extracted as hash bits. At this time, E is 1110 in the binary format, and the value of 1110 is used as the hash bits.

The place where the 4 bits of the hash value are located is designated through the 2nd to 5th values of $H_{(r,ID,i)}$, which is designated as Position Value (PV) 1 to 4 in order of position.

Therefore, PV1 to PV4 are 1, D, C, and 9, respectively, which are 1, 13, 12, and 9 in the decimal format. For some cases, the position value may be 0. However, since the 0th digit does not exist, an operation is performed so that PV=PV+1. Therefore, PV1 to PV4 become 2, 14, 13, and 10, respectively.

After that, bit positions to place the hash bits are specified, which are determined according to the values of P1 to P4 obtained by accumulating PV 1 to 4; in the current case, the values of P1 to P4 are 2, 16, 29, and 39, respectively. Therefore, hash bits of 1, 1, 1, and 0 are inserted into the 2nd, 16th, 29th, and 39th-bit positions among the 64 bits of the DATA field, respectively.

When the hash bits to be stored in the CAN message and the positions of the hash bits are determined, the hash bits are stored in the corresponding positions and thus transmitted.

Since the process above is performed in the same manner at the receiving node, whether a received message stores hash bits at the correct hash bit positions is examined. A message command is executed if the hash bits match the hash bit positions, whereas an intruder warning message is transmitted to the network if the matching fails.

In what follows, characteristics of authentication and intrusion detection performance evaluation according to the present disclosure will be described.

Figure 9:
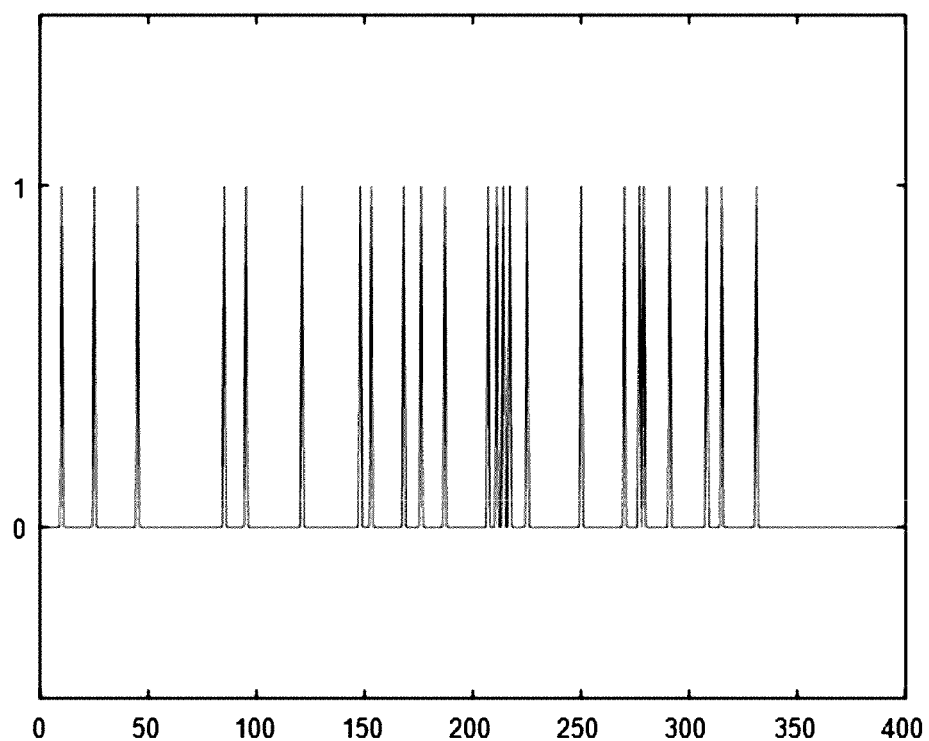
FIG. 9 is a graph illustrating characteristics of authentication and intrusion detection performance evaluation according to the present disclosure.

FIG. 9 is a graph illustrating characteristics of authentication and intrusion detection performance evaluation according to the present disclosure.

The evaluation process compares hash values when one of receiving nodes receives a message. When hash values are equivalent, the hash value of the corresponding ID is updated. On the other hand, if the hash values are not equal, the hash value is not updated, and an intruder warning message is transmitted.

Before proceeding with the evaluation, the hash ECU transmits an HRK. Then, a test was performed 100 times to check whether the transmitting ECU and the receiving ECU returned the same hash code for the same ID. It was confirmed that all of the 100 tests returned the same value.

After that, the intruder ECU performed a random number attack using a malicious message 1000 times for each ID. Among them, a detection result for 400 attacks with a malicious message performed with an ID of 0x100 is shown in FIG. 9.

A value of 0 means a successful defense against the attack in which the hash code of the malicious messages received by the transmitting ECU does not match, and the message is detected as an attacker message. Meanwhile, a value of 1 means that the attack is successful as the hash code matches, and the attacker message is accepted.

Table 2 summarizes the results of experiments performed for each NAME on the CAN DB.

TABLE 2

| | Received messages | Detected messages | Accepted messages | Detection rate |
|---|---|---|---|---|
| AAA | 4000 | 3758 | 242 | 0.9395 |
| BBB | 6000 | 5608 | 392 | 0.934667 |
| CCC | 5000 | 4697 | 303 | 0.9394 |
| DDD | 4000 | 3780 | 220 | 0.945 |
| EEE | 2000 | 1877 | 123 | 0.9385 |
| FFF | 4000 | 3736 | 264 | 0.934 |
| GGG | 3000 | 2795 | 205 | 0.931667 |
| HHH | 3000 | 2818 | 182 | 0.939333 |
| Sum | 31000 | 29069 | 1931 | 0.93771 |

The message authentication process is performed by storing the hash code in the 4-bit space of the data field in the CAN protocol.

As a result of the evaluation, 29069 malicious messages were detected in a total of 31,000 malicious message detection experiments; 1931 malicious messages were not detected and accepted. As the authentication code capacity is 4 bits, the code-matching probability for a random number attack is theoretically 1/16 (6.25%), and the actual result is 1931/31000 (6.229%). Therefore, the obtained accuracy is that the error is less than 0.4%.

The message chain-based CAN security system and method with a hash function according to the present disclosure described above may enable efficient detection of a malicious message through a message-based security scheme utilizing a hash function in the CAN system, a vehicle network system that does not provide a separate security protocol, and may be applied to various networks without increasing the number of computations by using a message chain-based security method that connects messages of the same ID into a chain by assigning a value generated through a hash function into the message transmitted periodically.

As described above, it should be understood that the present disclosure may be implemented in other modified forms without deviating from the inherent characteristics of the present disclosure.

In this respect, the disclosed embodiments should be considered in a descriptive point of view rather than restrictive point of view. The technical scope of the present disclosure should be judged by the appended claims rather than the descriptions given above, and all of the discrepancies which may be found within the range equivalent to the technical scope of the present disclosure should be interpreted to belong thereto.

DETAILED DESCRIPTION OF MAIN ELEMENTS

10: Hash value generating unit 20: Generation time determining unit
30: Hash reset key generating unit 40: Hash value regenerating unit
50: CAN message transmitting unit 60: Validity determining unit
70: Message receiving and executing unit 80: Warning transmitting unit

What is claimed is:

1. A message chain-based controller area network (CAN) security system with a hash function, the system comprising:
one or more processors; and
at least one electronic device storing instructions that, when executed by the one or more processors, cause the one or more processors to implement functions performed by:
a hash reset key generating unit to generate a Hash Reset Key ($HRK_r$) through a random number generation model and transmit the $HRK_r$ for processing;
a hash value generating unit to generate a hash value $H(_{r,ID},i)$ using the $HRK_r$ and message ID received by the system;
a generation time determining unit to determine whether a set time has elapsed from a hash value generation time in the hash value generating unit;
in response to determining that the set time has elapsed, the hash reset key generating unit generates a new Hash Reset Key ($HRK_r+1$) through the random number generation model and transmits the $HRK_r+1$ to the hash value generating unit for generating a new hash value $H'(_{r,ID},i)$ based on the $HRK_r+1$, wherein the new hash value $H'(_{r,ID},i)$ is a return value of the hash function using the $HRK_r+1$, the message ID, and Salt as input values, wherein the Salt value is a parameter set arbitrarily by a user and is a fixed value for increasing complexity of the hash function;
a CAN message transmitting unit to transmit a CAN message including the hash value $H(_{r,ID},i)$ and/or the new hash value $H'(_{r,ID},i)$;
a validity determining unit to determine whether the hash value $H(_{r,ID},i)$ and/or the new hash value $H'(_{r,ID},i)$ included in the CAN message matches a value held by the system;
a message receiving and executing unit to allow message reception and execute a command when the validity determining unit determines that the hash value $H(_{r,ID},i)$ and/or the new hash value $H'(_{r,ID},i)$ included in the CAN message matches with the value held by the system; and/or
a warning transmitting unit to transmit an intruder detection warning when it is determined that the hash value $H(_{r,ID},i)$ and/or the new hash value $H'(_{r,ID},i)$ of the CAN message received by the validity determining unit does not match the value held by the system.

2. The system of claim 1, wherein the one or more processors are configured to implement functions performed by:
a hash value regenerating unit to generate another hash value using the hash value $H(_{r,ID},i)$ when it is determined that the set time has not elapsed yet and transmit the another hash value to the CAN message transmitting unit for further processing.

3. The system of claim 1, wherein the one or more processors are configured to implement functions performed by:
a node selected as a master to periodically transmit an initialization message,
a lower-level slave node to generate a corresponding hash value for each message ID according to a value stored in the initialization message,
a CAN node to transmit 4 bits extracted from the generated hash value $H(_{r,ID},i)$ by including the extracted 4 bits in a vehicle control message, and
a receiving node to detect a malicious message by determining whether the extracted 4 bits from the generated hash value $H(_{r,ID},i)$ matches with corresponding 4-bits in an existing hash value in response to receiving the vehicle control message.

4. The system of claim 1, wherein the one or more processors are configured to implement functions performed by:
a hash electronic control unit (ECU) to generate the $HRK_r$ and transmit the $HRK_r$ to a lower-level communication node, and
the lower-level communication node to generate the hash value $H(_{r,ID},i)$ using the $HRK_r$ and the message ID.

5. A message chain-based controller area network (CAN) security method with a hash function, the method comprising:
generating, by a hash reset key generating unit, a Hash Reset Key ($HRK_r$) through a random number generation model and transmitting the $HRK_r$ to a hash value generating unit;
generating, by the hash value generating unit, a hash value $H(_{r,ID},i)$ using the $HRK_r$ and message ID to be transmitted or received by a system;
determining, by a generation time determining unit, that a set time has elapsed from a hash value generation time in the hash value generating unit;
in response to determining that the set time has elapsed, the hash reset key generating unit generates a new Hash Reset Key ($HRK_r+1$) through the random number generation model and transmits the $HRK_r+1$ to the hash value generating unit for generating a new hash value $H'(_{r,ID},i)$ based on the $HRK_r+1$, wherein the new hash value $H'(_{r,ID},i)$ is a return value of the hash function using the $HRK_r+1$, the message ID, and Salt as input values, the Salt value is a parameter set arbitrarily by a user and is a fixed value for increasing complexity of the hash function;
transmitting, by a CAN message transmitting unit, a CAN message including the hash value $H(_{r,ID},i)$ and/or the new hash value $H'(_{r,ID},i)$ to a validity determining unit;
determining, by the validity determining unit, whether the hash value $H(_{r,ID},i)$ and/or the new hash value $H'(_{r,ID},i)$ included in the CAN message matches a value held by the system;

allowing message reception and executing a command, by a message receiving and executing unit, when the validity determining unit determines that the hash value $H_{(r,ID,i)}$ and/or the new hash value $H'_{(r,ID,i)}$ included in the CAN message matches with the value held by the system; and/or transmitting, by a warning transmitting unit, an intruder detection warning when it is determined that the hash value $H_{(r,ID,i)}$ and/or the new hash value $H'_{(r,ID,i)}$ of the CAN message does not match with the value held by the system.

6. The method of claim 5, further comprising:

generating, by a hash value regenerating unit, another hash value using the hash value $H_{(r,ID,i)}$ when it is determined that the set time has not elapsed yet and transmitting the another hash value to the CAN message transmitting unit for further processing.

7. The method of claim 5, wherein a node selected as a master periodically transmits an initialization message, a lower-level slave node generates a corresponding hash value for each message ID according to the value stored in the initialization message, and the method further comprising:
extracting, by a CAN node, 4 bits from the generated hash value $H_{(r,ID,i)}$;

transmitting, to a receiving node and by the CAN node, a vehicle control message including the 4 bits extracted from the generated hash value $H_{(r,ID,i)}$; and detecting, by the receiving node, a malicious message based on determining whether the extracted 4 bits received in the vehicle control message matches with corresponding 4-bits in an existing hash value.

8. The method of claim 5, wherein a hash electronic control unit (ECU) generates the $HRK_r$ and transmits the $HRK_r$ to a lower-level communication node, and the lower-level communication node generates the hash value $H_{(r,ID,i)}$ using the $HRK_r$ and the message ID received by the lower-level communication node.

* * * * *